United States Patent

[11] 3,575,428

[72] Inventors Ernst Fuhrmann;
Siegfried Teucher; Fritz Bondroit;
Friedhelm Stecher; Paul Vossieck,
Burscheid, Germany
[21] Appl. No. 845,116
[22] Filed June 13, 1969
Division of Ser. No. 530,341, May 16, 1966
Pat. No. 3,519,278
[45] Patented Apr. 20, 1971
[73] Assignee Goetzewerke Friedrich Goetze A. G.
Burscheid, Germany
[32] Priority May 14, 1965
[33] Germany
[31] G43596

[54] SEALING ARRANGEMENT
3 Claims, 8 Drawing Figs.
[52] U.S. Cl..................................................... 277/153, 277/235
[51] Int. Cl......................................................... F16j 15/00, F16j 9/06, F02f 5/00
[50] Field of Search........................................... 277/152, 235; 277/153, 164, 235 (B)

[56] References Cited
UNITED STATES PATENTS
3,346,266 10/1967 Bondroit .................... 277/153
3,433,490 3/1969 Teucher et al............... 277/235BUX Primary Examiner—Samuel G. Rothberg
Attorney—Spencer & Kaye ABSTRACT: A sealing element composed of a body of resiliently deformable material, a helical coil spring disposed along one edge of the body and arranged to be laterally deformable, and a sheath having a C-shaped cross section and enclosing at least one-half of the coil circumference of the spring.

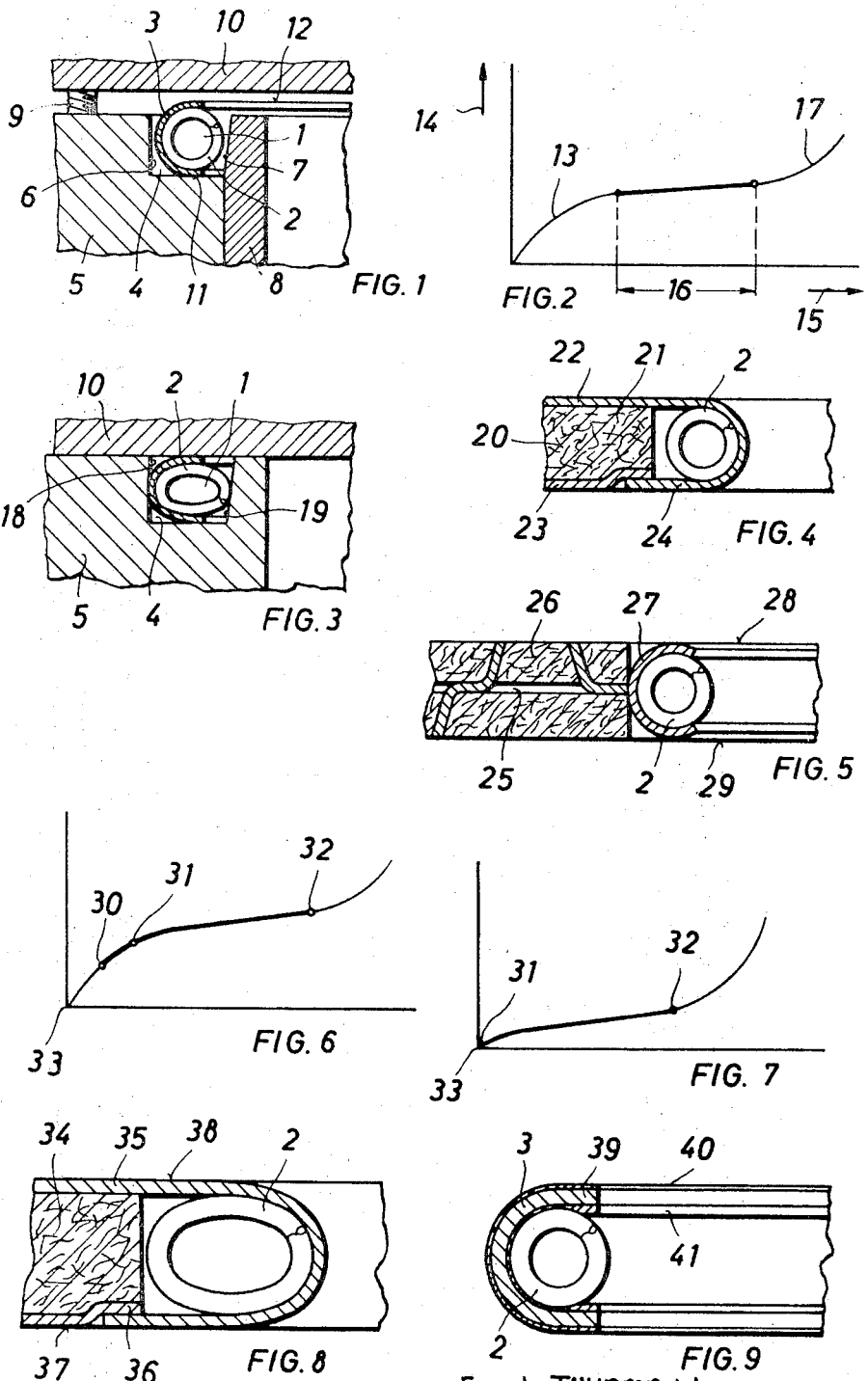

SEALING ARRANGEMENT

This is a division of application Ser. No. 550,341, filed May 16, 1966 now U.S. Pat. No. 3,519,278.

The present invention relates to a sealing arrangement designed to cooperate with flanges for sealing the enclosures defined by structures such as the cylinder heads of internal combustion engines.

Various types of gaskets, or sealing rings, are already known in the art for forming a seal between flanges, or similar enclosure members. These gaskets generally consist of an elastic core of a soft material, which is generally asbestos, and of either a one-piece or a multiple-piece cover which either completely or partially encloses the soft material.

It is also known to seal the combustion chambers of an internal combustion engine by means of purely metallic sealing members which permit an improved compensation of thermal and mechanical distortions to be achieved. For this purpose, the sealing member must display certain specific elastic properties because it is often required to seal a space whose dimensions vary in a periodic manner due to temperature and internal pressure fluctuations. In order to increase the elasticity of such metallic sealing members, supporting springs were frequently provided and were either partially or entirely enclosed by a metallic jacket. In the case of a partial enclosure of the supporting springs, particularly when the jacket body has either a U-shaped or C-shaped cross section with the aperture between its leg portions extending toward the pressure chamber, it is possible to utilize the pressure of the medium in the sealed enclosure to augment the sealing pressure. Such supporting springs may be constituted by helically-wound annular springs the coils of which are disposed relatively close to one another and are arranged to be compressively stressed in a direction transverse to the spring axis.

It has also been suggested to construct cylinder head seals, or gaskets, for internal combustion engines of a metallically reinforced soft material and to additionally border the sealing edge, or rim, surrounding the combustion chamber with metal strips.

It has further been suggested to reinforce the sealing edges, or rims, by means of inherently resilient filler, or insert bodies and to simultaneously increase their elasticity by properly selecting the material and the configuration of the elastic bodies used. The resilient bodies which have already been proposed consist of insert, or filler rings which are corrugated or which have a U-shaped cross section. The resilient bodies may also consist of the carrier and/or sealing part of the cylinder head gasket, which in this case are rolled together at the sealing edge or rim.

It may thus be seen that proposals have already come from various sources for the employment of a wide variety of seals, or gaskets, for flanges, particularly for the cylinder heads of internal combustion engines, for the purpose of maintaining or improving the elasticity of the sealing edges, or rims.

It has generally been found, however, that the elasticity of the embedded resilient bodies of gaskets, or seals, of this type decreases considerably after a prolonged period of service, thus impairing the sealing capability thereof. Moreover, after disassembly of the cylinder heads, such seals, or gaskets, can no longer be used and must be replaced by a new gasket.

It is a primary object of the present invention to overcome these drawbacks.

A more specific object of this invention is to provide a sealing gasket having an extremely long service life.

Another object of the present invention is to provide a sealing gasket which retains a substantially constant elasticity over a long period of time.

Still another object of the present invention is to provide a sealing gasket which need not be manufactured to narrow tolerances.

A yet further object of the present invention is the provision of a seal or gasket provided with a resilient body which displays as uniform a sealing power, or capacity, as possible over a relatively large deformation range during the compressive stressing and relieving thereof.

It is a further object of the present invention to provide a seal or gasket capable of experiencing a wide range of static deformations and thermal distortions.

In accordance with the present invention, these and other objects are achieved by the provision, in combination with two members arranged to be joined together to define a close space and a recess surrounding such space, of sealing means disposed in the recess for providing a sealing joint. This sealing means extends between the members and surrounds the space. The sealing means essentially includes a laterally deformable helical coil spring having a plurality of coils adjacent to one another, and an annular sheath surrounding at least half of the coil circumference of the spring. The sheath is made of a deformable material and has a C-shaped cross section. The spring coils are dimensioned, with respect to dimensions of the recess, for being laterally deformed, and thus for applying a sealing force, when the members are joined together. In accordance with a particular feature of the present invention, the degree of such lateral deformation is chosen to lie at a point along the flattest portion of a curve representing the sealing force applied by the coils as a function of the amount of lateral deformation thereof in the direction of such sealing force.

Another arrangement according to the present invention is constituted by a gasket for providing a sealing joint between two members. This gasket essentially includes a sealing element constituted by a body of resiliently deformable material and a helical coil spring disposed along one edge of the body. The coil spring has a plurality of coils adjacent to one another, with one lateral dimension of each coil extending parallel to the thickness dimension of the body. The gasket further includes a sheath surrounding the spring and enclosing at least one-half of the coil circumference thereof, this sheath being made of a deformable material having a C-shaped cross section.

Additional objects and advantages of the present invention will become apparent upon consideration of the following description when taken in conjunction with the accompanying drawings in which:

FIG. 1 is an elevational, cross-sectional view of a first embodiment of the present invention in position prior to sealing.

FIG. 2 is a curve showing the resistance to deformation of the gasket of FIG. 1.

FIG. 3 is a view similar to that of FIG. 1 showing the gasket in a sealing condition.

FIG. 4 is an elevational, cross-sectional, detailed view of another embodiment of the present invention.

FIG. 5 is a view similar to that of FIG. 4 showing still another embodiment of the present invention.

FIG. 6 is a graph of the deformation characteristic of one gasket according to the present invention.

FIG. 7 is a view similar to that of FIG. 6 for another embodiment of the present invention.

FIG. 8 is an elevational, cross-sectional, detailed view of yet another embodiment of the present invention.

FIG. 9 is a view similar to that of FIG. 8 of a still further embodiment of the present invention.

Referring now first to FIG. 1, there is shown a gasket 1 according to the present invention composed of a resilient body 2 which is partially surrounded by a sheath 3. The gasket 1 is positioned in a recess 4 formed in the cylinder block 5. At the time of the installation of gasket 1, and before this gasket is placed under compression, a clearance exists between the gasket and the sidewalls 6 and 7 of recess 4, the sidewall 6 being formed in cylinder block 5 and the sidewall 7 constituting a portion of the outer wall of the bushing 8 defining the cylinder. This clearance is provided in order to permit the resilient body 2 to spread in one lateral direction (in a horizontal direction in the plane of FIG. 1) when it is compressed in a perpendicular lateral direction (in a vertical direction in the plane of FIG. 1) during the closing of cylinder head 10. Such a deformation will give the resilient body 2 an elliptical cross section.

The resilient body 2 is constituted by an annular coil spring having a plurality of adjacent coil turns. When this spring is compressed by the closing of cylinder head 10, each of these coil turns will assume an elliptical configuration.

The closing of cylinder head 10 is effected by tightening the cylinder head screws 9 so as to drive the cylinder head 10 against the cylinder block 5. The deformation of the spring 2 causes the spring to exert a sealing pressure which acts along the annular contact portions 11 and 12 of sheath 3.

Referring now to FIG. 2 there is shown a curve 13 of the relation between the sealing force applied by the element 2 and the amount of lateral deformation corresponding to this force. The ordinate 14 of the chart represents the compression pressure, and hence the resulting sealing force, while the abscissa 15 represents the amount of lateral deformation of the spring 2 in the direction of the compression pressure. The heavy line portion 16 of curve 13 represents the intended working range of the sealing member according to the present invention. This range is chosen so as to be disposed just ahead of the steeply rising portion 17 of the curve. The portion 17 represents the behavior of spring 2 at the time when its lateral spreading is limited by contact with the walls 6 and 7 of recess 4.

FIG. 3 shows the shape imparted to spring 2 when cylinder head 10 is tightened down so as to bear against cylinder block 5. Under these conditions, the spring 2 assumes an elliptical cross section and the lateral surfaces 18 and 19 of recess 4 serve as abutments which apply restraining forces substantially at right angles to the direction of the compression force. Therefore, when the gasket 1 comes into contact with the surfaces 18 and 19, the resistance to deformation of spring 2 rises sharply, corresponding to the curve portion 17 of FIG. 2, thereby impeding further deformations of spring 2. According to one feature of the present invention, the gasket 1 does not come to abut against walls 18 and 19 when it is only subjected to the static compression force produced by the normal tightening down of the cylinder head 10.

The dimensions of spring 2, sheath 3 and recess 4 are preferably chosen, in accordance with a principal feature of the present invention, so that the tightening down of cylinder head 10 produces a deformation of spring 2 which lies somewhere along the portion 16 of the curve 13 shown in FIG. 2. Specifically, when the gasket is designed for use in the most common types of internal combustion engine, the above-mentioned dimensions should be so chosen that when the spring is deformed by the tightening of head 10, a further lateral deformation of the spring of the order of 0.1 mm. in the direction of the compression pressure applied thereto will be produced by a variation in the compression pressure of only 2 to 13 percent of the nominal compression pressure. One type of spring capable of exhibiting such a deformation characteristic may be constructed to have a coil diameter of 3 mm. This spring may be fabricated from a wire, of a spring steel material, having a diameter of 0.3 mm.

The sheath 3 is made of a deformable material and may be made of a deformable metal or plastic which is plastically and/or elastically deformable.

As has been noted above, the dimension of the spring 2 are chosen, in accordance with a principal feature of the present invention, so that when the cylinder head is tightened down the amount of lateral deformation imported to the spring will be disposed somewhere along the portion 16 of the characteristic curve of FIG. 2. When this condition is satisfied, the sealing element 1 will be able to maintain a substantially constant sealing pressure over a relatively wide range of dynamic deformations. Such deformations may be caused, for example, by thermal distortions or by a varying pressure within the cylinders. Thus, such distortions or varying pressures will not result in a varying sealing pressure and gasket 1 will be capable of maintaining a relatively constant sealing force for a long period of time and under varying conditions.

In order to assure that the deformation of the spring 2 does lie in the desired portion of its characteristic curve when the cylinder head is tightened down, it is necessary to dimension the recess 4, or other similar receiving space, so that the spring coils will not abut against the lateral recess walls 6 and 7 (or 18 and 19) until after its deformation has passed through the region 16 of curve 13.

In accordance with another feature of the present invention, a gasket may be formed by combining the resilient member 1 with a gasket made of a soft material of a type known per se. According to a further feature of the present invention, it is proposed to preliminarily deform the spring to a point corresponding to the beginning of the flat portion of its deformation curve so that when the gasket is installed, any deformation applied to it by the assembly with which it is associated will lie along the flat portion of its characteristic curve.

When the spring is employed in combination with a gasket made of a soft material, it is preferable, in accordance with another feature of the present invention, to suitably dimension the spring and its surrounding sheath so as to cause the pressure contact regions of the sheath to lie in the same planes as the contact surfaces of the soft material gasket.

Several arrangements of this type are shown in detail in the succeeding drawings.

FIG. 4 shows an arrangement wherein the spring 2 is combined with a flat gasket 20. Gasket 20 is constituted by a body 21 of soft material and two metallic covering sheets 22 and 23. Sheet 22 is curved around resilient spring 2 to form a lug or sheath 24 which encloses spring 2 and thus embeds the spring into the edge of the resulting gasket. This placement of the spring 2 gives the edge of the gasket a high degree of resiliency and produces a sealing effect which is equal in quality to that produced by the arrangement shown in FIGS. 1 and 3.

Referring now to FIG. 5, there is provided an arrangement wherein a supporting body 25 is embedded in the soft material portion 26 of a gasket. At one edge thereof, the body 25 is formed as a sheath portion 27 having a C-shaped cross section. The surface portions 28 and 29 of portion 27 define the pressure supporting, or sealing, surfaces of the gasket rim.

If, in the embodiment of FIG. 4, the diameter of the spring 2 is greater than the thickness of the body of soft material 20, the gasket edge defined by spring 2 will be thicker than the remainder of the gasket when the arrangement is not under compression. The same result will be produced, if, in the embodiment of FIG. 5, the combined diameter of spring 2 and portion 27 is greater than the thickness of gasket portion 26. This condition is undesirable inasmuch as it will cause a greater sealing pressure to be exerted by the edge of the gasket than by the main portion thereof. This can be avoided by subjecting the spring 2, in either embodiment, to a preliminary permanent deformation which is sufficient to give the pressure-supporting surfaces of the gasket a perfectly planar configuration. This deformation imparts an elliptical cross section to the spring.

Although this preliminary deformation of spring 2 is a substantially plastic, i.e., permanent, deformation, the residual elasticity of the spring will cause it to initially bear against the pressure-supporting surfaces of its sheath with a certain amount of force, thus assuring that spring 2 will always apply some degree of sealing pressure.

FIG. 6 shows a characteristic deformation curve for such a precompressed spring, which curve has the same coordinates as the curve of FIG. 2. The preliminary compression of spring 2 places it at the point 30 on its characteristic curve. When the gasket is installed it is further initially compressed by an amount sufficient to place the spring 2 at the point 31 of its curve so that during normal operation it exerts a sealing pressure which remains substantially constant if the spring is further deformed to any point between the points 31 and 32 of its deformation curve.

The spring may also be given a larger initial diameter and may be preliminarily deformed by a sufficiently large amount to place it at the point 31 of its deformation curve prior to its installation. The resulting deformation curve for such a spring is shown in FIG. 7, wherein it may be seen that this preliminary deformation causes the point 31 to lie at the coordinate axis of the curve. Thus, the entire deformation of the spring, after installation of the gasket, will lie along the flat portion of its curve, which extends between the points 31 and 32.

Referring now to FIG. 8, there is shown an arrangement similar to that of FIG. 4, wherein a body of soft material 34 is enclosed between two metal reinforcing sheets 35 and 36. The spring 2 is embedded in the rim of the resulting gasket assembly and is held in place by the curved end of sheet 35, this end forming a sheath. The spring 2, which was originally of circular cross section and had a diameter which was greater than the thickness of body 34, was preliminarily deformed so as to have the elliptical cross section shown. It was deformed by a sufficient amount to make the minor diameter of the resulting ellipse equal to the thickness of body 34. As a result, the pressure-supporting surfaces of the metallic sheets surrounding spring 2 are coplanar with the pressure-supporting surfaces 37 and 38 of body 34.

It will be noted that all of the embodiments of the present invention thus far described employ a relatively hard, resilient material as the sheath covering the spring 2. In accordance with a further feature of the present invention, it is proposed to provide each surface of a sheath of such material with a layer of relatively soft material. One layer of this material will come in contact with the surface to be sealed and will thereby achieve a more effective sealing since it will more readily conform to any irregularities in this surface. The other layer of soft material will come into contact with the spring 2 and will primarily serve to prevent the spring coils from shifting or tipping in a direction along the longitudinal spring axis during spring compression. Such movement will be prevented because the spring coils will sink into the soft layer to some extent and will thus be gripped by this layer.

One embodiment of such an arrangement is shown in FIG. 9 wherein there is provided a sheath 3' consisting of a core layer 39 of a relatively hard material and two covering layers 40 and 41 made of an extremely soft material, such as soft rubber, for example. When a sheath of this type is used, the coils of spring 2 will sink into layer 41 during lateral compression and will thus be prevented from experiencing any movement along the longitudinal spring axis.

The soft external layer 40 acts to improve the sealing ability of the resulting gasket due to its ability to conform more closely to any irregularities in the surfaces to be sealed.

It may thus be seen that the present invention involves a gasket whose resilient body provides a relatively constant sealing force over a relatively large lateral deformation range. This is of great advantage in situations where dynamic stresses and distortions in the arrangement being sealed produce a wide variation in the deformation of the gasket. The gasket according to the present invention thus permits a constant sealing pressure to be applied even when the dimensions of the sealing gap in which the gasket is disposed vary over a wide range due to thermal distortions and other causes.

Moreover, this ability of the gasket to apply a relatively constant sealing force over a wide range of sealing gap dimensions permits wider tolerances to be employed in the manufacture of the elements between which the gasket is to be interposed.

In addition, since the deterioration of the sealing capacity of prior art gaskets made of a body of resilient, or fibrous material, was generally most pronounced at the edges thereof, the construction of a gasket, according to the present invention, composed of such a body of fibrous material with a helical spring positioned at its edge results in an arrangement whose edges are not subjected to any substantial deterioration in sealing capability over a long period of time. As a result, such a gasket can be safely reinstalled, even after having been removed during the disassembly of the device in which it was originally installed.

It will be understood that the above description of the present invention is susceptible to various modifications, changes, and adaptations, and the same are intended to be comprehended within the meaning and range of equivalents of the appended claims.

We claim:

1. A gasket for providing a sealing joint between two members, comprising, in combination:
   a. sealing element constituted by a body of resiliently deformable material;
   b. a helical coil spring disposed along one edge of said body and having a plurality of coils adjacent one another, with one lateral dimension of each said coil extending parallel to the thickness dimension of said body; and
   c. a sheath surrounding said spring and enclosing at least one-half of the coil circumference thereof, said sheath being made of a deformable material and having a C-shaped cross section.

2. An arrangement as defined in claim 1 wherein said helical spring is given a permanent preliminary deformation for giving each of said coils the form of an ellipse whose minor axis is parallel to the thickness dimension of said body, the amount of such preliminary deformation being such that any further lateral deformation of said coils will lie along the flattest portion of a curve representing the sealing force applied by said coils as a function of the amount of lateral deformation thereof in the direction of such sealing force.

3. An arrangement as defined in claim 2 wherein said coils are preliminarily deformed by an amount such that the sealing surfaces defined by said sheath are coplanar with the sealing surfaces defined by said sealing element.

UNITED STATES PATENT OFFICE
CERTIFICATE OF CORRECTION

Patent No. 3,575,428    Dated April 20th, 1971

Inventor(s) Ernst Fuhrmann; Siegfried Teucher; Fritz Bondroi Friedhelm Stecher and Paul Vossieck It is certified that error appears in the above-identified patent and that said Letters Patent are hereby corrected as shown below:

In the heading of the patent, line 7, change "530,341" to --550,341--. Column 3, line 61, change "dimension" to --dimensions--; line 64, change "imported" to --imparted--.

Signed and sealed this 5th day of October 1971.

(SEAL)
Attest:

EDWARD M. FLETCHER, JR.          ROBERT GOTTSCHALK
Attesting Officer                Acting Commissioner of Patent: